United States Patent
Ohta et al.

(10) Patent No.: US 10,598,830 B2
(45) Date of Patent: Mar. 24, 2020

(54) SCREEN MEMBER, IMAGE DISPLAY APPARATUS, AND OBJECT APPARATUS

(71) Applicant: Ricoh Company, Ltd., Tokyo (JP)

(72) Inventors: Yusuke Ohta, Kanagawa (JP); Jun Watanabe, Kanagawa (JP); Yasuhiro Satoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/129,360

(22) Filed: Sep. 12, 2018

(65) Prior Publication Data
US 2019/0025473 A1    Jan. 24, 2019

Related U.S. Application Data

(63) Continuation of application No. PCT/JP2017/008905, filed on Mar. 7, 2017.

(30) Foreign Application Priority Data

Mar. 16, 2016    (JP) ................................. 2016-051811

(51) Int. Cl.
    *G02B 3/00*        (2006.01)
    *G03B 21/62*      (2014.01)
                   (Continued)

(52) U.S. Cl.
    CPC ......... *G02B 3/0056* (2013.01); *G02B 3/0037* (2013.01); *G02B 3/04* (2013.01);
                   (Continued)

(58) Field of Classification Search
CPC ...................................................... G03B 21/56
(Continued)

(56) References Cited

U.S. PATENT DOCUMENTS

| | | | | |
|---|---|---|---|---|
| 4,534,614 A | * | 8/1985 | Silverglate | ......... H04B 10/1143 |
| | | | | 250/216 |
| 4,740,780 A | * | 4/1988 | Brown | ................... G02B 27/01 |
| | | | | 345/7 |

(Continued)

FOREIGN PATENT DOCUMENTS

| | | |
|---|---|---|
| EP | 2962984 A1 | 1/2016 |
| JP | 2006-058789 | 3/2006 |

(Continued)

OTHER PUBLICATIONS

Isomet, Acousto Optics, http://www.isomet.com/acousto_optics.html, Copyright © 2014 Isomet Corporation All Rights Reserved. (Year: 2014).*

(Continued)

*Primary Examiner* — Clayton E. LaBalle
*Assistant Examiner* — Kevin C Butler
(74) *Attorney, Agent, or Firm* — Xsensus LLP

(57) ABSTRACT

A screen member irradiated with image display light is provided. The screen member includes an optical element having an optical surface configured to reflect or refract light, wherein an absolute value of a local curvature of the optical surface changes in one direction of a plane perpendicular to an optical axis of the optical element, and becomes a local minimum at at least one position.

20 Claims, 18 Drawing Sheets

(51) Int. Cl.
G02B 3/04 (2006.01)
G02B 3/06 (2006.01)
H04N 9/31 (2006.01)
G02B 26/08 (2006.01)
G02B 27/01 (2006.01)
G09G 3/02 (2006.01)

(52) U.S. Cl.
CPC ........... *G02B 3/06* (2013.01); *G02B 26/0833* (2013.01); *G02B 27/0101* (2013.01); *G03B 21/62* (2013.01); *H04N 9/3129* (2013.01); *H04N 9/3155* (2013.01); *H04N 9/3182* (2013.01); *G02B 27/01* (2013.01); *G02B 2027/011* (2013.01); *G02B 2027/0118* (2013.01); *G02B 2027/0145* (2013.01); *G09G 3/02* (2013.01)

(58) Field of Classification Search
USPC ........................................................ 359/452
See application file for complete search history.

(56) References Cited

U.S. PATENT DOCUMENTS

| | | | | |
|---|---|---|---|---|
| 5,329,272 | A * | 7/1994 | Massarelli | G02B 27/0101 340/461 |
| 5,991,075 | A | 11/1999 | Katsuragawa et al. | |
| 6,465,610 | B1 * | 10/2002 | Kishi | B29C 33/02 523/106 |
| 6,519,761 | B1 * | 2/2003 | Satoh | G03F 7/0005 430/18 |
| 6,782,526 | B2 | 8/2004 | Satoh | |
| 6,875,380 | B2 | 4/2005 | Kishi et al. | |
| 7,794,643 | B2 * | 9/2010 | Watanabe | B29C 45/561 264/1.1 |
| 8,611,614 | B2 * | 12/2013 | Yamanaka | G06K 9/00604 382/115 |
| 9,158,124 | B2 * | 10/2015 | Saisho | G02B 26/101 |
| 9,344,691 | B2 * | 5/2016 | Hirai | G01N 21/958 |
| 9,798,140 | B2 * | 10/2017 | Inamoto | G02B 3/0056 |
| 2004/0058466 | A1 * | 3/2004 | Ushijima | G02B 1/02 438/31 |
| 2007/0070507 | A1 * | 3/2007 | Yee | G02B 3/0018 359/622 |
| 2009/0201589 | A1 * | 8/2009 | Freeman | G02B 27/0103 359/630 |
| 2010/0103077 | A1 * | 4/2010 | Sugiyama | G02B 27/017 345/8 |
| 2012/0218641 | A1 * | 8/2012 | Kikuchi | G02B 3/0056 359/619 |
| 2012/0250306 | A1 * | 10/2012 | Sugiyama | B60K 35/00 362/231 |
| 2013/0050834 | A1 * | 2/2013 | Fujikawa | G02B 27/0101 359/630 |
| 2013/0242275 | A1 * | 9/2013 | Kilcher | G02B 26/0833 353/98 |
| 2014/0253995 | A1 * | 9/2014 | Ohhashi | G02B 26/125 359/206.1 |
| 2015/0358574 | A1 * | 12/2015 | Henion | H04N 5/7458 348/745 |
| 2016/0349513 | A1 * | 12/2016 | Okamoto | G02B 27/0172 |
| 2017/0052438 | A1 * | 2/2017 | Decock | G03B 21/58 |
| 2018/0024360 | A1 | 1/2018 | Inamoto et al. | |
| 2019/0146237 | A1 * | 5/2019 | Uchida | G02B 3/00 |

FOREIGN PATENT DOCUMENTS

| | | | | |
|---|---|---|---|---|
| JP | 2006058789 | * | 3/2006 | ............ G02B 27/26 |
| JP | 2007-34118 | A | 2/2007 | |
| JP | 2010-145746 | | 7/2010 | |
| JP | 2010-271465 | | 12/2010 | |
| JP | 2013-214019 | | 10/2013 | |
| JP | 5310810 | | 10/2013 | |
| JP | 2014-060621 | | 4/2014 | |
| JP | 2014-139655 | | 7/2014 | |
| JP | 2014-139656 | | 7/2014 | |
| JP | 2014-139657 | | 7/2014 | |
| JP | 2014-172237 | | 9/2014 | |
| JP | 2015-095879 | | 5/2015 | |
| JP | 2015-108838 | | 6/2015 | |
| JP | 2015-131470 | | 7/2015 | |
| JP | 2015-147343 | | 8/2015 | |
| JP | 2016-010950 | | 1/2016 | |
| JP | 2016-024419 | | 2/2016 | |
| JP | 2016-027368 | | 2/2016 | |
| JP | 2016-109883 | | 6/2016 | |
| JP | 2017-021079 | | 1/2017 | |
| JP | 2017021079 | * | 1/2017 | ............ G02B 27/18 |
| WO | 02/025369 | A1 | 3/2002 | |
| WO | 2011/074209 | A1 | 6/2011 | |
| WO | 2015/169889 | A1 | 11/2015 | |
| WO | 2015/187685 | A1 | 12/2015 | |

OTHER PUBLICATIONS

Isomet, Acousto Optics, http://www.isomet.com/acousto_optics.html, Copyright © 2014 Isomet Corporation All Rights Reserved. Isomet, Deflectors, http://www.isomet.com/acousto_optic_deflectors.html, Copyright © 2014 Isomet Corporation All Rights Reserved, 2 pgs (Year: 2014).*
U.J. Schmidt, Electro-optic deflection of a laser beam, Phillips Technical Review, vol. 36, 1976, No. 5, 16 pages (Year: 1976).*
Extended European Search Report dated Feb. 5, 2019 in European Patent Application No. 17766445.5, 8 pages.
International Search Report dated May 30, 2017 in PCT/JP2017/008905 Filed on Mar. 7, 2017 (with English translation).
Written Opinion dated May 30, 2017 in PCT/JP2017/008905 Filed on Mar. 7, 2017.

* cited by examiner

SCREEN MEMBER, IMAGE DISPLAY APPARATUS, AND OBJECT APPARATUS

CROSS-REFERENCE TO RELATED APPLICATIONS

The present application is a continuation application of International Application No. PCT/JP2017/008905, filed on Mar. 7, 2017, which claims priority to Japanese Patent Application No. 2016-051811, filed on Mar. 16, 2016. The contents of these applications are incorporated herein by reference in their entirety.

BACKGROUND OF THE INVENTION

1. Field of the Invention

The disclosures herein generally relate to a screen member, an image display apparatus, and an object apparatus.

2. Description of the Related Art

In recent years, screen members irradiated with image display light have been actively developed.

For example, Patent Document 1 discloses a screen member having a plurality of optical elements (such as lenses and mirrors) provided in an array. However, the screen member disclosed Patent Document 1 has scope for improvement in enhancing visibility while securing a visual field.

RELATED-ART DOCUMENTS

[Patent Document 1] Japanese Patent No. 5310810

SUMMARY OF THE INVENTION

According to an embodiment, a screen member irradiated with image display light is provided. The screen member includes an optical element having an optical surface configured to reflect or refract light, wherein an absolute value of a local curvature of the optical surface changes in one direction of a plane perpendicular to an optical axis of the optical element, and becomes a local minimum at at least one position.

DESCRIPTION OF THE PREFERRED EMBODIMENTS

In the following, a HUD apparatus 100 as an image display apparatus according to one embodiment will be described with reference to the accompanying drawings. HUD is an abbreviation for a head-up display.

Figure 1:
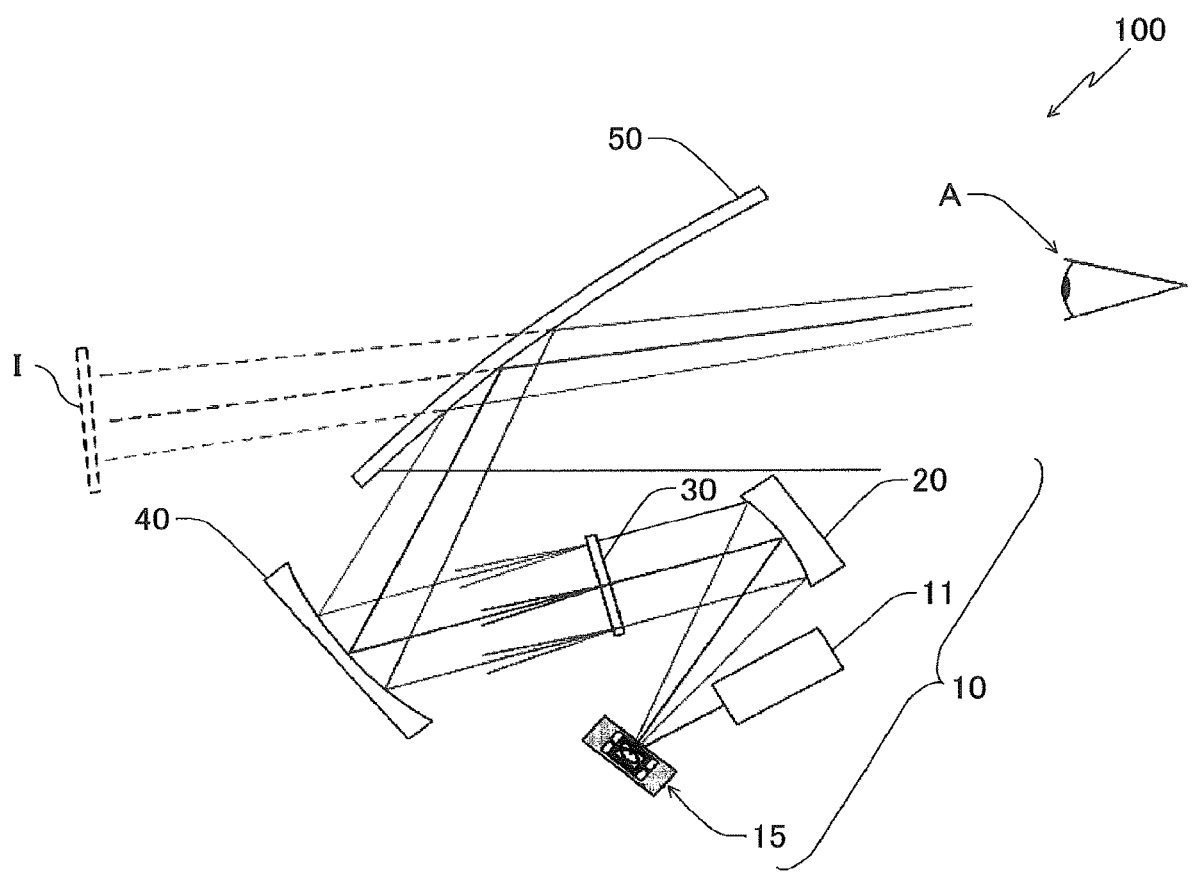
FIG. 1 is a diagram illustrating a schematic arrangement of a HUD apparatus according to one embodiment.

FIG. 1 schematically illustrates a general arrangement of the HUD apparatus 100 according to the present embodiment.

«General Arrangement of HUD Apparatus»

As a projection method of a head-up display, there is a panel method and a laser scanning method. In the panel method, an intermediate image is formed by using an imaging device such as a liquid crystal panel, a digital mirror device (DMD) panel, or a vacuum fluorescent display (VFD). In the laser scanning method, an intermediate image is formed by scanning a laser beam emitted from a laser beam source by using a two-dimensional scanning device. Unlike the panel method that forms an image by emitting light to a panel while partially blocking the light emitted to the panel, the laser scanning method forms an image by assigning light emission and non-light emission for each pixel, allowing a high-contrast image to be formed.

The HUD apparatus 100 employs the laser scanning method. Of course, the above-described panel method may also be used as a projection method As an example, the HUD apparatus 100 is installed in a moving object such as a vehicle, an aircraft, a ship, or an industrial robot, and causes navigation information (such as a speed of the moving object, a travelling direction, a distance to a destination, a name of a current location, a presence or a position of an object in front of the moving object, signs such as speed limits, and traffic congestion information) required for the steering of the moving object to be visible on a front windshield (see FIG. 1) of the moving object. In this case, the front windshield 50 also functions as a transmissive reflection member configured to transmit part of incident light and reflects at least part of the rest of the incident light. In the following, the HUD apparatus 100 includes the front windshield 50. An example in which the HUD apparatus 100 is installed in an automobile, which is a kind of vehicle, will be mainly described below.

As illustrated in FIG. 1, the HUD apparatus 100 includes: an optical scanning device 10 including a light source device 11, an optical deflector 15, and a scanning mirror 20; a screen 30; and a concave mirror 40. By emitting image display light, a virtual image I can be made visible on the front windshield 50 from a viewpoint position of a viewer A (a driver who is an occupant of the automobile). Namely, the viewer A can visually identify an image (an intermediate image) formed (rendered) on the screen 30 as a virtual image I through the front windshield 50.

As an example, the HUD apparatus 100 is disposed below a dashboard of the automobile, and a distance between the viewpoint position of the viewer A and the front windshield 50 is approximately several tens of centimeters to 1 meter.

The concave mirror 40 is designed to have given converging power by using an existing optical design simulation software such that the virtual image I is formed at a desired position.

In the HUD apparatus 100, the converging power of the concave mirror 40 is preferably set such that the virtual image I is formed at a position (a depth position) greater than or equal to 1 m to less than or equal to 10 m (preferably less than or equal to 6 m) away from the viewpoint position of the viewer A.

In general, the front windshield is not flat, but is slightly curved. Therefore, an image forming position of the virtual image I is determined by both the concave mirror 40 and the curved surface of the front windshield 50.

The light source device 11 combines laser beams of three colors, red, green, and blue that are modulated in accordance with image data. The combined laser beam (in which the laser beams of the three colors are combined) is directed toward a reflective surface of the optical deflector 15. The optical deflector 15 is a two-axis microelectromechanical systems (MEMS) scanner manufactured by a semiconductor manufacturing process, and includes a single micro-mirror 150 (see FIG. 5) that can independently oscillate around two axes orthogonal to each other. The light source device 11 and the optical deflector 15 will be described later in detail.

Light (pixel display light) emitted from the light source device 11 in accordance with the image data is deflected by the optical deflector 15, reflected by the scanning mirror 20, and irradiated to the screen 30. By optically scanning the screen 30, an intermediate image is formed on the screen 30. The concave mirror 40 is preferably designed and arranged to correct optical distortion that causes a horizontal line of an intermediate image to become upwardly or downwardly convex due to the shape of the front windshield 50.

The light that has passed through the screen 30 is reflected by the concave mirror 40 toward the front windshield 50. Part of the light incident on the front windshield 50 is transmitted through the front windshield 50 and at least part of the rest of the light is reflected toward the viewpoint position of the viewer A. As a result, the viewer A can visually identify an enlarged virtual image I of the intermediate image through the front windshield A. Namely, when viewed from the viewer A, the virtual image I is enlargedly displayed through the front windshield 50.

Further, a combiner may be provided as a transmissive reflection member on the viewpoint position side of the viewer A relative to the front windshield 50. Similarly to a case in which only the front windshield 50 is irradiated with light from the concave mirror 40, a virtual image may be displayed by irradiating the combiner with light from the concave mirror 40.

«Hardware Configuration of Control System of HUD Apparatus»

Figure 2:
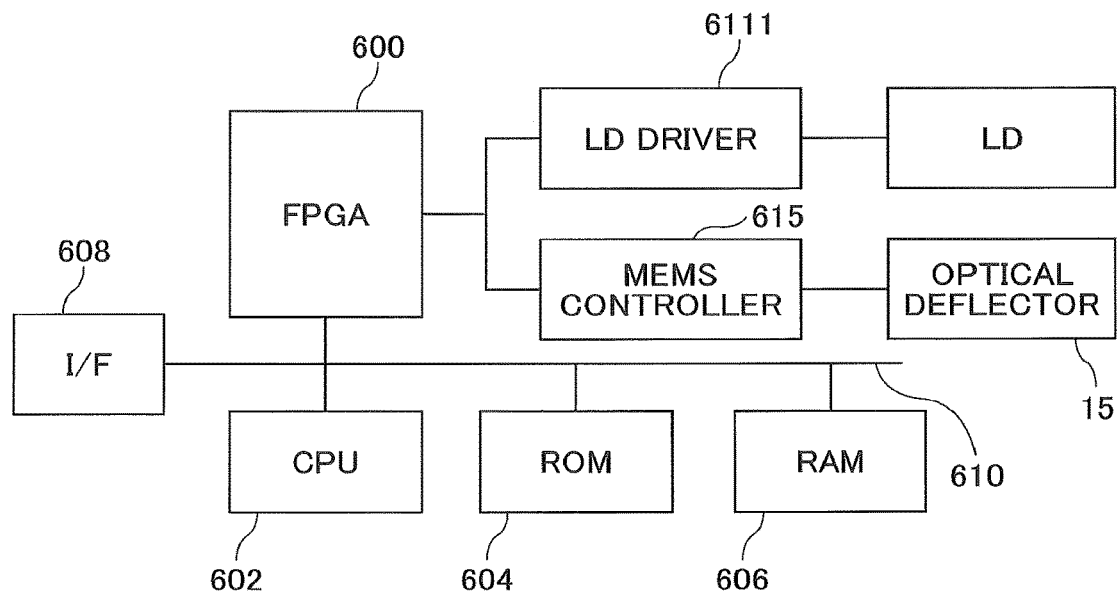
FIG. 2 is a block diagram illustrating a hardware configuration of a control system of the HUD apparatus.

FIG. 2 is a block diagram illustrating a hardware configuration of a control system of the HUD apparatus 100. As illustrated in FIG. 2, the control system of the HUD apparatus 100 includes a field-programmable gate array (FPGA) 600, a central processing unit (CPU) 602, read-only memory (ROM) 604, an interface (I/F) 608, a bus-line 610, a laser diode (LD) driver 6111, and a MEMS controller 615.

The FPGA 600 drives LDs, which will be described later, by means of the LD driver 6111, and drives the optical deflector 15 by means of the MEMS controller 615. The CPU 602 controls functions of the HUD apparatus 100. The ROM 604 stores image processing programs executed by the CPU 602 to control the functions of the HUD apparatus 100. Random access memory (RAM) 606 is used as a work area of the CPU 602. The I/F 608 is an interface for communicating with an external controller and the like. For example, the I/F 608 is coupled to a Controller Area Network (CAN) of the automobile.

«Functional Blocks of HUD Apparatus»

Figure 3:
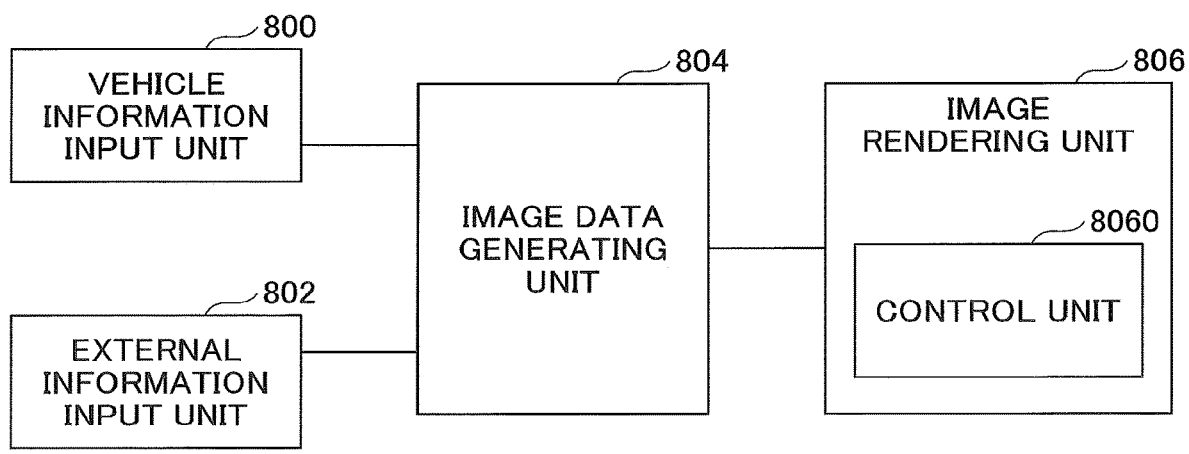
FIG. 3 is a block diagram illustrating functions of the HUD apparatus.

FIG. 3 is a block diagram illustrating functions of the HUD apparatus. As illustrated in FIG. 3, the HUD apparatus includes a vehicle information input unit 800, an external information input unit 802, an image data generating unit 804, and an image rendering unit 806. Information relating to a vehicle (information such as a speed, a travel distance, a distance to an object, and outside brightness) from the CAN is input in the vehicle information input unit 800. External information (information such as navigation information from the global positioning system (GPS)) is input in the external information input unit 802. The image data generating unit 804 generates image data of an image to be rendered, based on information input in the vehicle information input unit 800 and in the external information input unit 802, and sends the generated image data to the FPGA 600. The image rendering unit 806 includes a control unit 8060. The control unit 8060 sends a control signal for starting or finishing rendering an image to FPGA 600.

«Light Source Device»

Figure 4:
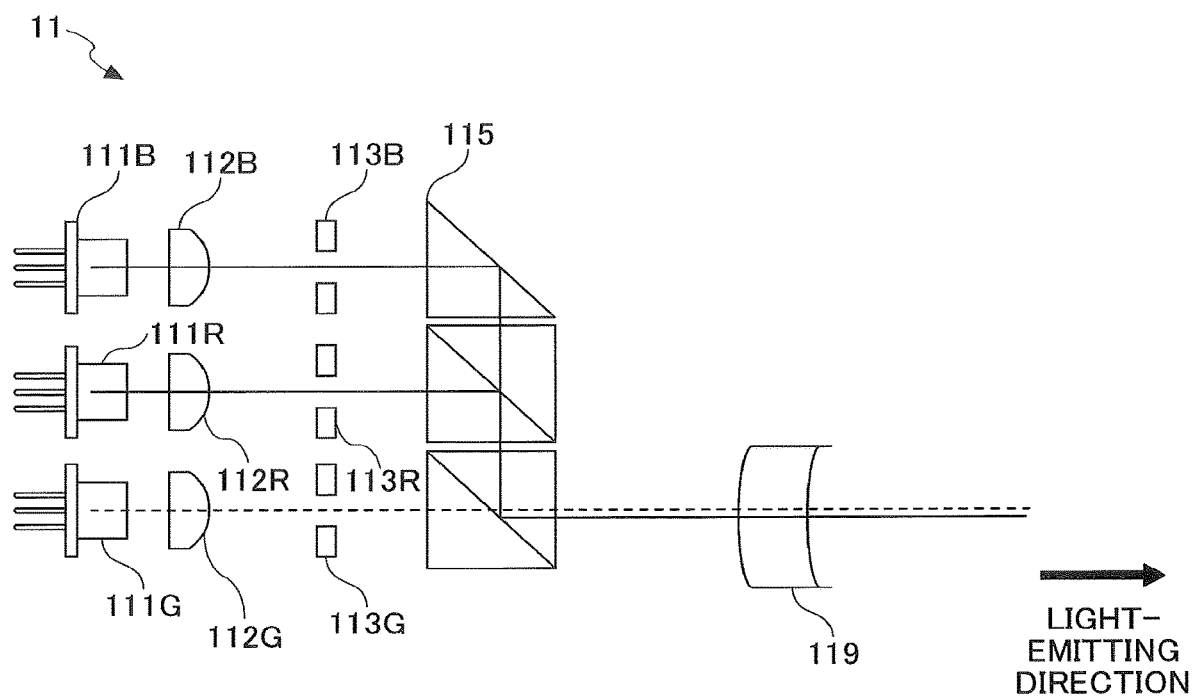
FIG. 4 is a diagram for explaining a light source device of the HUD apparatus.

FIG. 4 illustrates a configuration of the light source device 11. As illustrated in FIG. 4, the light source device 11 includes a plurality of light emitting elements 111R, 111B, and 111G each having one or more light emitting points. The light emitting elements are laser diodes (LDs) and emit light flux having different wavelengths λR, λG, and λB, respectively. For example, λR is 640 nm, λG is 530 nm, and λB is 445 nm. The light fluxes having the wavelengths λR, λG, and λB emitted from the LDs 111R, 111G, and 111B are coupled to a subsequent optical system by corresponding coupling lenses 112R, 112G, and 112B, respectively. The light fluxes coupled to the optical system are shaped by corresponding aperture members 113R, 113G, and 113B. A shape of each of the aperture members may be set to any of various shapes, including a circular shape, an ellipse shape, a rectangular shape, and a square shape depending on, for example, the divergence angle of the light flux. Subsequently, the light fluxes shaped by the corresponding aperture members are combined by a combining element 115 into a single optical path. The combining element 115 is a plate-like or a prismatic dichroic mirror, and reflects or transmits a light flux therethrough in accordance with the wavelength and combines the light fluxes into a single optical path. The combined light flux is guided to the reflective surface of the optical deflector 15 by a lens 119. The lens 119 is a meniscus lens whose concave surface faces the optical deflector 15.

«Optical Deflector»

Figure 5:
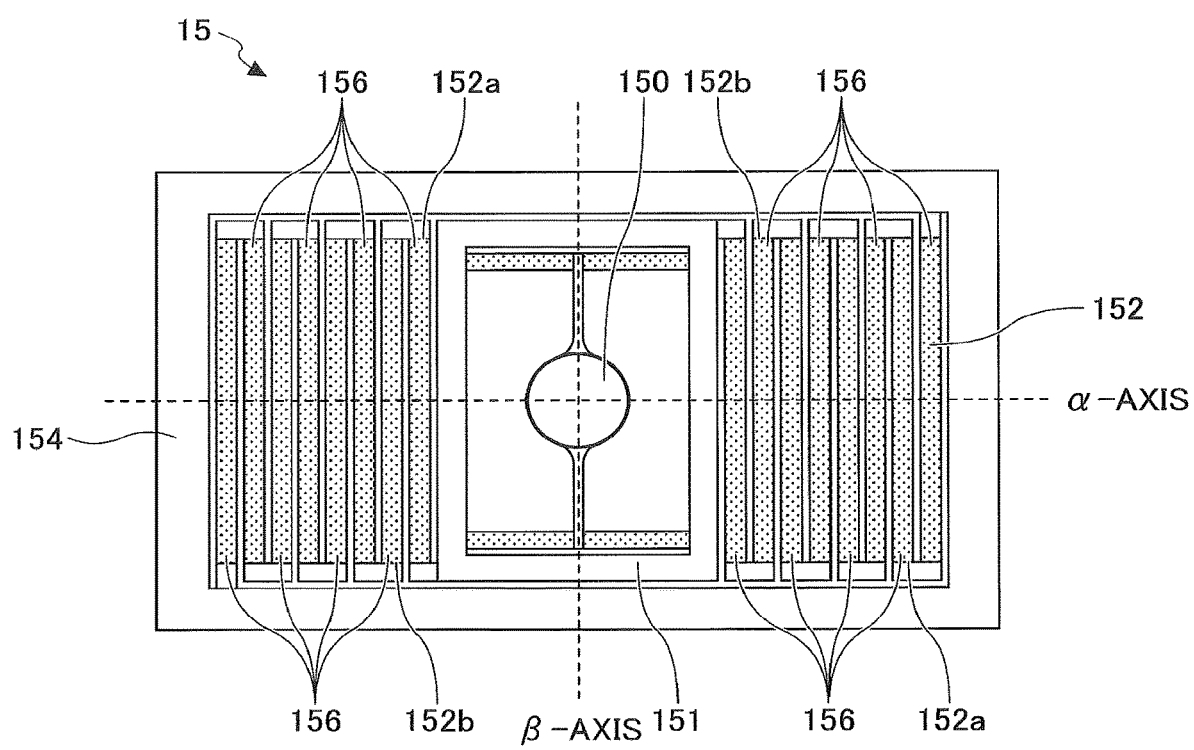
FIG. 5 is a diagram for explaining an optical deflector of the HUD apparatus.
Figure 5:
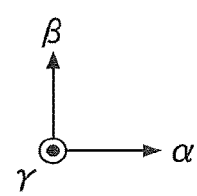

FIG. 5 illustrates a configuration of the optical deflector 15. The optical deflector 15 is a two-axis MEMS scanner manufactured by a semiconductor manufacturing process, and includes a mirror 150 having a reflective surface and also includes a pair of serpentine units 152, as illustrated in FIG. 5. The serpentine units 152 include a plurality of beams arranged in the α-axis direction, and neighboring two beams are connected to each other through a turning portion so as to meander. Neighboring two beams of the serpentine units 152 are referred to as a beam A (152a) and a beam B (152b), and are supported by a frame 154. A plurality of piezoelectric members 156 (for example, lead zirconate titanate (PZT)) is provided for the respective beams. By applying different voltages to the piezoelectric members of two neighboring beams included in each of the serpentine units, two neighboring beams are deflected in different directions. As the amount of such deflection is accumulated, the mirror 150 is caused to rotate at a large angle around the α-axis (in the vertical direction). In the above-described configuration, optical scanning around the α-axis in the vertical direction can be performed at low voltage. Conversely, resonant optical scanning around the β axis in the horizontal direction is performed using, for example, a torsion bar that is connected to the mirror 150.

«Optical Scanning and Virtual Image Display»

In an instant, only a dot image equivalent to a beam diameter is projected from the HUD apparatus 100. However, as scanning is performed at very high speed, an afterimage remains in human eyes in a single frame image. By making use of this afterimage phenomenon, the driver can perceive an image as being projected onto a display region. Specifically, an image formed on the screen is reflected by the concave mirror 40 and the front windshield 50, such that the driver perceives the image as a virtual image in the display region. With this mechanism, in order not to display a virtual image, light emission from the LDs may be stopped. Namely, in the display region, the luminance of a region other than a region where a virtual image is displayed may be set to substantially zero.

Namely, an imaging position of a virtual image formed by the HUD apparatus 100 may be set to any position in a predetermined display region where the virtual image can be formed. The display region is determined by design at the design phase of the HUD apparatus.

In this way, by employing the laser scanning method, it is possible to take measures such as turning off the LDs or decreasing the intensity of light in the region other than the region where a virtual image is displayed.

Conversely, for example, in the panel method that uses an imaging device such as a liquid crystal panel or a DMD panel to form an intermediate image, the panel is required to be entirely irradiated with light. Therefore, because of the nature of the liquid crystal panel or the DMD panel, it is difficult to completely set the luminance to zero even with an image signal for the non-display state being sent. As a result, there may be a case in which black floating is seen. In the laser scanning method, it is possible to eliminate such black floating.

Figure 6:
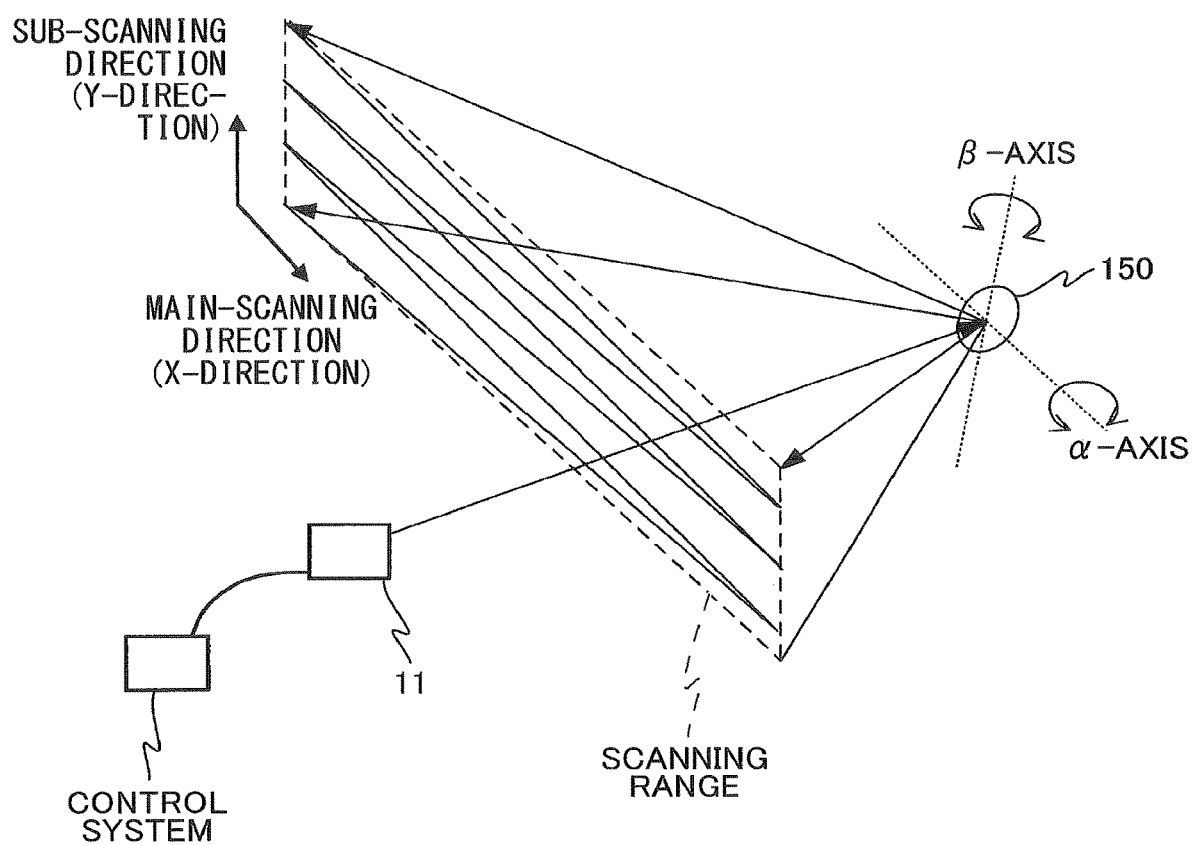
FIG. 6 is a diagram illustrating a corresponding relationship between a mirror and a scanning range of the optical deflector.

Note that the FPGA 600 controls the light-emission intensity, the timing of light emission, and the light waveform of each of the light emitting elements of the light source device 11, and the LD driver 6111 drives each of the light emitting elements to emit light. Light emitted from each of the light emitting elements and combined into a single optical path is two-dimensionally deflected by the optical deflector 15 around the α-axis and the β-axis as illustrated in FIG. 6, and the screen 30 is irradiated with the deflected light that has passed through the scanning mirror 20 (see FIG. 1). In this configuration, the deflected light serves as scanning light. Namely, the screen 30 is two-dimensionally scanned by the scanning light. In FIG. 6, the scanning mirror 20 is not illustrated.

Figure 7:
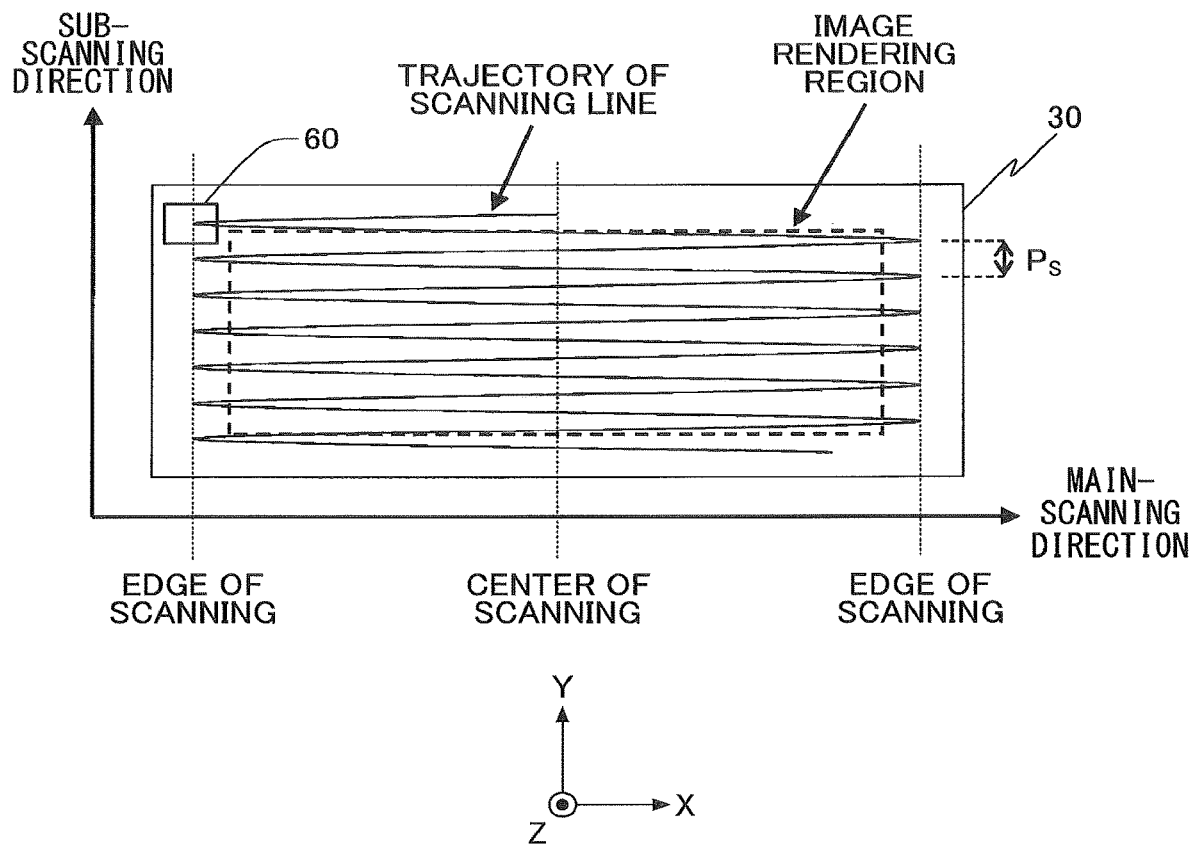
FIG. 7 is a diagram illustrating an example of a trajectory of a scanning line when two-dimensional scanning is performed.

As illustrated in FIG. 7, the screen 30 includes a scanning light detection unit 60 in a peripheral region of an image rendering region (also referred to as an "effective scanning region"). The scanning light detection unit 60 is disposed to detect an operation of the optical deflector 15. Further, the scanning light detection unit 60 is used to maintain image quality at a certain level by detecting scanning timing (a scanning position of a beam) in response to light emitted onto a signal region and by controlling characteristic changes of the optical deflector 15 associated with an environmental change or a change over time. As the scanning light detection unit 60, an optical deflector such as a photodiode or a phototransistor can be used.

An output signal from the scanning light detection unit 60 is sent to the FPGA 600. The FPGA 600 generates modulated signals (pulse signals) for the respective colors based on an output signal and image data from the detection unit 60, and sends the generated signals to the LD driver 6111. The LD driver 6111 applies driving currents corresponding to the modulated signals for respective colors to the light emitting elements corresponding to the respective colors. Accordingly, a color image (an intermediate image) in accordance with the image data is rendered on the screen 30.

The screen 30 provided in a scanning range is scanned by scanning light in an oscillating manner (two-way scan) in a main scanning direction at a high frequency of about 20,000 to 40,000 hertz (Hz), and is scanned by scanning light (one-way scan) in a sub-scanning direction at a low frequency of about a few tens of Hz. Namely, raster scanning is performed. At this time, light emission of each of the light emitting elements is controlled in accordance with the scanning position (the position of the scanning light). Accordingly, an image can be rendered and a virtual image can be displayed per pixel. In FIG. 7, the number of scanning lines is less than the actual number of scanning lines for convenience of explanation.

The term "scanning range" refers to the entire range that can be scanned by the optical deflector 15. The image rendering region is illustrated as a rectangle shape, but may be distorted to a trapezoid shape or a circular sector shape. In particular, when the screen 30 is directly irradiated with light deflected by the optical deflector 15, it is inevitable that the image rendering region is distorted.

In a laser-scanning type HUD, an image is displayed by being superimposed on the background. Thus, it is required to set luminance of the displayed image to an appropriate value for background luminance.

Further, an in-vehicle HUD is assumed to be used in an environment where brightness changes depending on the surrounding environment (for example, the entrance or exit of a tunnel and a road condition), the time of a day, the weather, and the like. Thus, a wide dynamic range is required for luminance of an image displayed. Further, in such an in-vehicle HUD, a display area on the screen greatly changes. This is because, for example, display and non-display of an image are switched as necessary.

In consideration of the above-described use conditions and use environments, it is extremely important to sufficiently ensure luminance (brightness) of an image (virtual image) displayed, regardless of brightness of the surrounding environment. Particularly, in order to improve visibility in a bright surrounding environment, it is required to raise the upper limit of luminance.

In the HUD apparatus 100 according to the present embodiment, a structure of the screen 30 is devised. In the following, the screen 30 will be described in detail.

«Screen»

Figure 8:
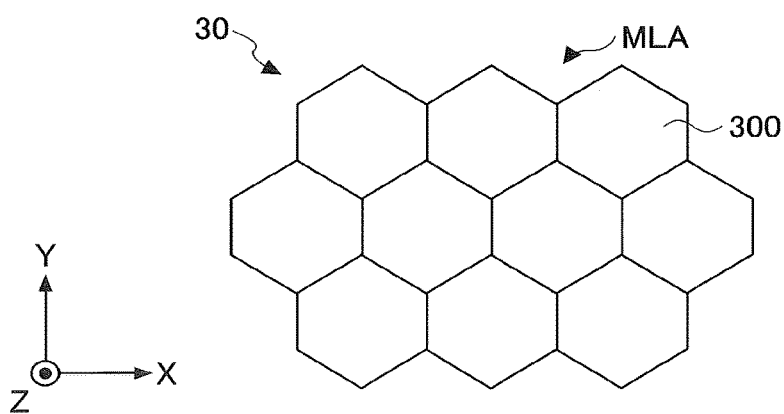
FIG. 8 is a plan view illustrating a cutaway of a microlens array (MLA)

As illustrated in FIG. 8, the screen 30 has a microlens array structure having microlenses 300, which are microconvex lenses, arranged without a gap in the image rendering region on the surface of the incident side. The microlenses 300 each cause a laser beam, which is emitted from the light source device and passes through the optical deflector 15 and the scanning mirror 20, to diverge at a desired divergence angle (see FIG. 9A). In an XYZ three-dimensional rectangular coordinate system illustrated in FIG. 8, an X-axis is a horizontal direction, and a Z-axis is an optical axis direction of each of the microlenses. The optical axis of each of the microlenses refers to a straight line passing through the optical center and the focal point of each of the microlenses.

The term "pixel display light" refers to light of "image display light" for each pixel. A plurality of pixel display light beams forming the image display light is in one-to-one correspondence with the plurality of microlenses 300. Namely, each of the pixel display light beams is approximately entirely incident within an effective diameter range of the corresponding microlens 300.

The microlenses 300 each have a six-sided shape in planar view with a width of approximately a few hundred micrometers, for example. The six-sided shape allows the microlenses 300 to be most closely arranged. The shape of the microlenses 300 is not limited to the six-sided shape. The microlenses 300 may have a rectangular shape or a triangle shape.

Figure 9A:
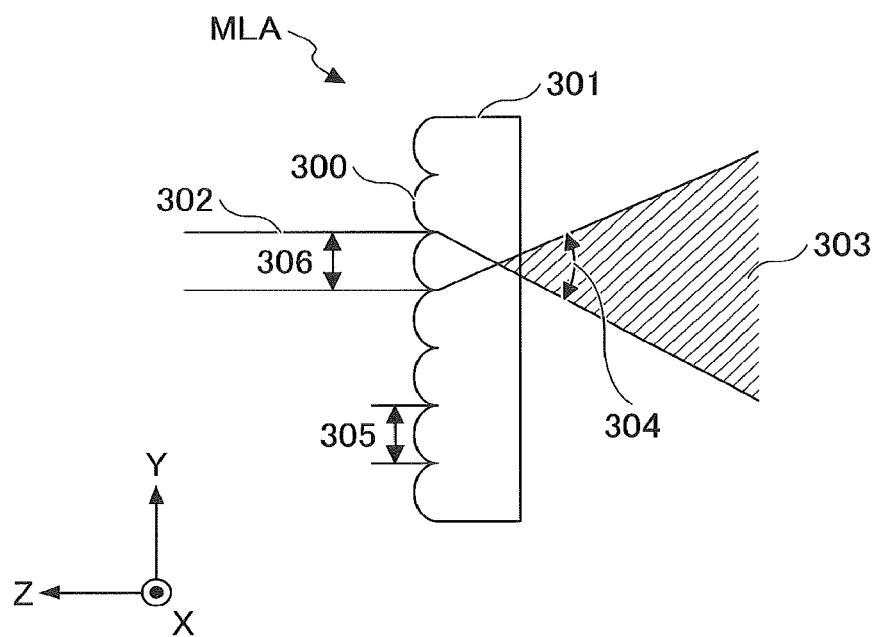
FIG. 9A is a diagram for explaining an effect of the microlens array (MLA)

Namely, the screen 30 includes an optical plate 301 in which a microlens array (MLA) (microlens array structure) having the plurality of two-dimensionally arranged microlenses is formed on the surface of the incident side (the surface on the +Z side and parallel to a XY-plane) (see FIG. 9A). The screen 30 is made of a resin or glass, for example. The plurality of microlenses 300 is two-dimensionally arranged along the XY-plane.

As illustrated in FIG. 9A, when an incident light flux 302 scans the optical plate 301, the light flux diverges and becomes divergent light 303. The structure of the microlenses 300 allows the incident light flux to diverge at a desired divergence angle 304.

Typically, an arrangement period 305 of microlens array lenses is designed to be larger than a diameter 306 of the incident light flux. This prevents interference between the lenses and also prevents speckles from appearing.

Figure 9B:
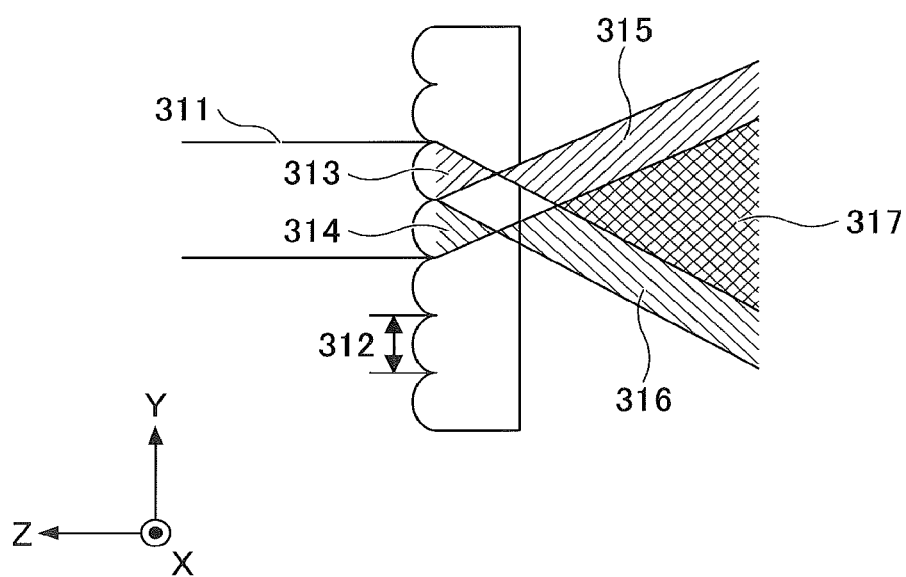
FIG. 9B is a diagram for explaining an example in which speckles appear when the microlens array is irradiated with a laser beam.

FIG. 9B illustrates an optical path of divergent light when light flux 311 has a diameter twice as large as an arrangement period 312 of the microlens array. The light flux 311 is concurrently incident on two lenses 313 and 314 and two divergent light beams 315 and 316 are formed. At this time, as the two divergent light beams are concurrently present in a region 317, the two divergent light beams interfere with each other. When the interfering beams are incident on an observer's eyes, speckles are observed.

In consideration of the above, in the present embodiment, the arrangement period 305 of the microlens array (MLA) is designed to be larger than the diameter 306 of the light flux such that speckles can be reduced. For example, when the diameter 306 of the light flux is 100 μm, the arrangement period 305 of the lenses is designed to be 110 μm, 150 μm, or 200 μm, for example. Further, although FIG. 9 illustrates convex lenses, concave lenses exhibit a similar effect.

Figure 10:
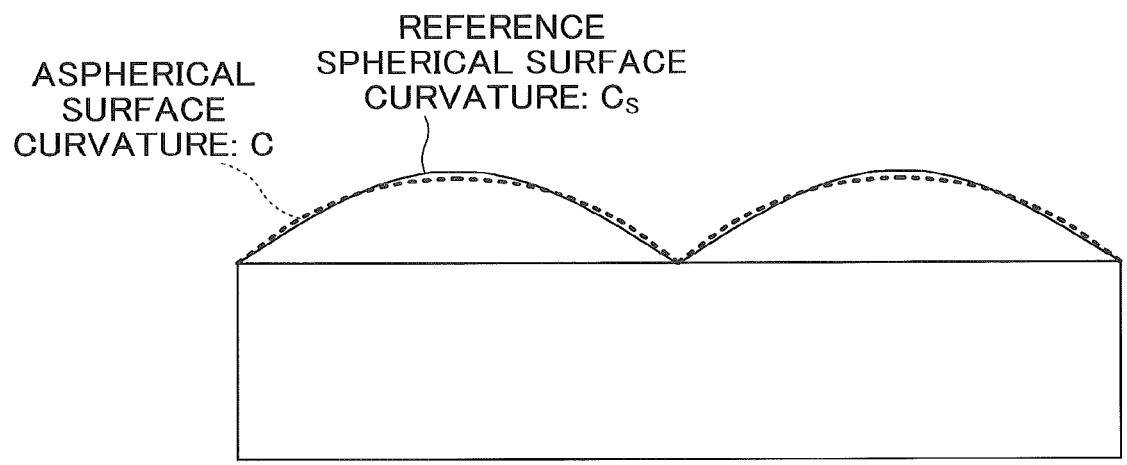
FIG. 10 is a diagram for explaining formation of aspherical microlenses.

Next, referring to FIG. 10, formation of aspheric microlenses will be described. FIG. 10 illustrates superimposed cross-sections including optical axes of two microlens arrays each, from a microlens array of spherical lenses and from a microlens array of aspherical lenses. In FIG. 10, a continuous line indicates a spherical surface (a curvature Cs), and a dashed line indicates an aspherical surface (local curvatures (CX and CY)). In the spherical lenses, the curvature takes a fixed value. In the aspherical lenses, the curvature changes depending on the position. CX and CY represent local curvatures in the X-direction and in the Y-direction, respectively. In FIG. 10, represents at least one of CX and CY.

Figure 11A:
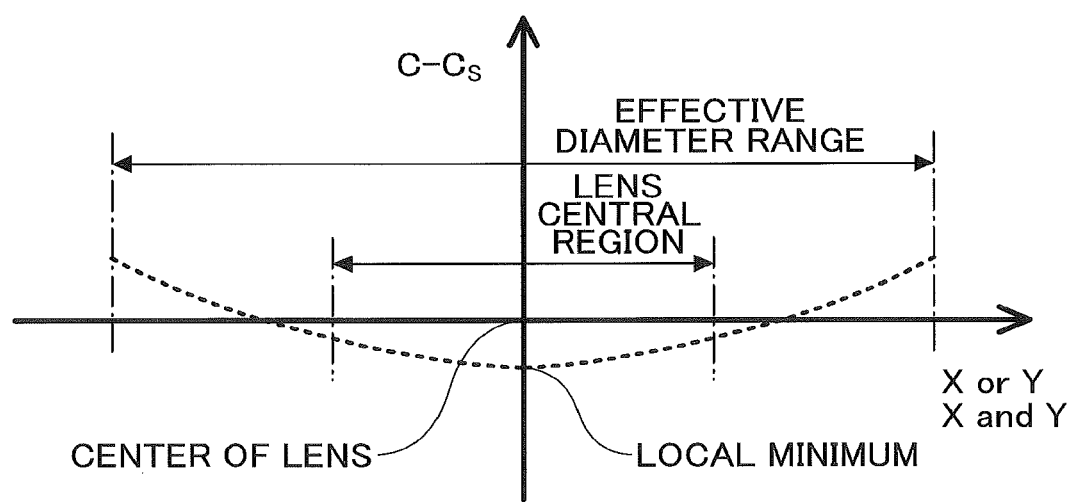
FIG. 11A is a graph illustrating curvature distribution of an aspherical lens AL1 in at least one of a X-direction and a Y-direction with respect to a spherical lens.
Figure 11B:
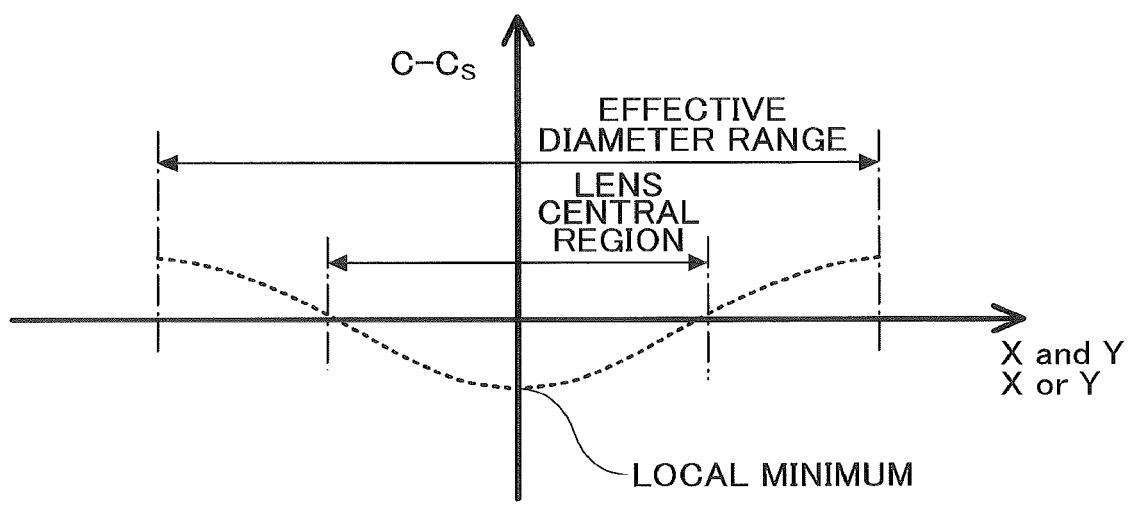
FIG. 11B is a graph illustrating curvature distribution of an aspherical lens AL2 in at least one of a X-direction and a Y-direction with respect to the spherical lens.
Figure 12A:
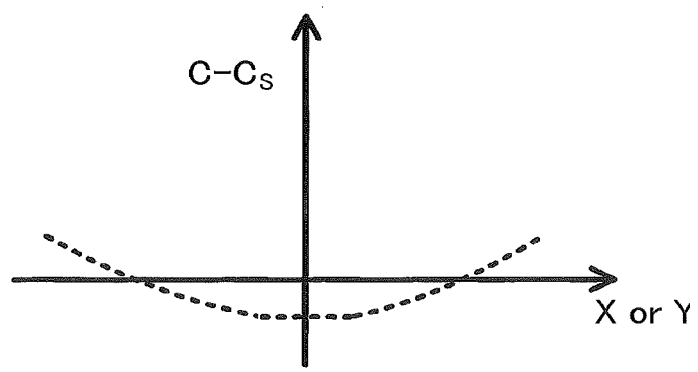
FIG. 12A is a drawing illustrating an example (part 1) in which an absolute value of a local curvature of an aspherical lens AL does not become a local minimum in one of the X-direction and Y-direction.
Figure 12B:
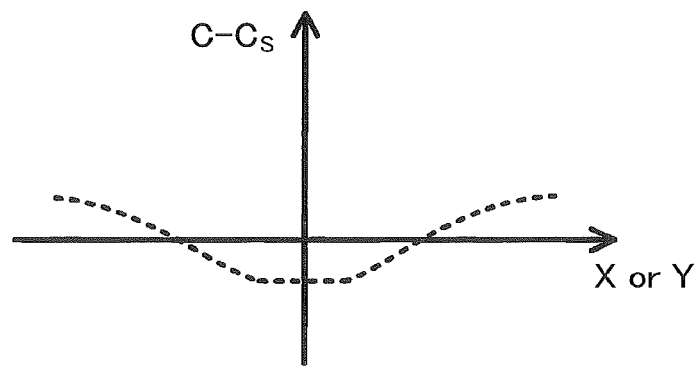
FIG. 12B is a drawing illustrating an example (part 2) in which the absolute value of the local curvature of the aspherical lens AL does not become a local minimum in one of the X-direction and Y-direction.
Figure 12C:
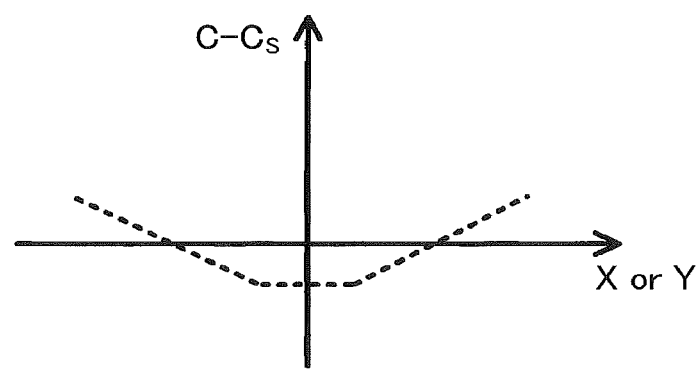
FIG. 12C is a drawing illustrating an example (part 3) in which the absolute value of the local curvature of the aspherical lens AL does not become a local minimum in one of the X-direction and Y-direction.
Figure 12D:
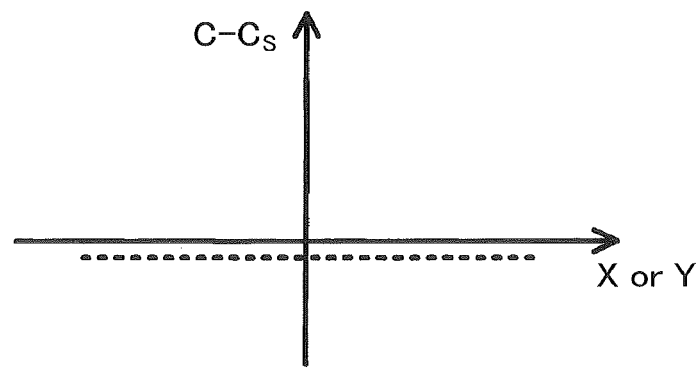
FIG. 12D is a drawing illustrating an example (part 4) in which the absolute value of the local curvature of the aspherical lens AL does not become a local minimum in one of the X-direction and Y-direction.

FIG. 11A and FIG. 11B each illustrate curvature distribution of aspherical lenses AL1 and AL2 with respect to the curvature Cs of a spherical lens. The aspherical lenses AL1 and AL2 are specific examples of an aspherical lens AL used as each of the microlenses 300 in the microlens array (MLA) according to the present embodiment. Geometrical centers of the lenses illustrated in FIG. 11A and FIG. 11B coincide with each other and the geometrical centers are each regarded as the origin of the X-axis and the Y-axis. In the following, in the aspherical lens AL, it is assumed that the optical center and the geometrical center coincide with each other in planar view (when viewed in the Z-axis direction).

In the aspherical lens AL, at least one of absolute values of local curvatures CX and CY becomes a local minimum in a region (also referred to as a "lens central region") that includes a point of intersection (also referred to as a "a center of the lens surface" or a "center of the lens") of a lens surface and an optical axis. Further, the size of the lens central region is determined by the optical design (for example, the size and the position of the observer's eye box) of the HUD apparatus 100.

In principle, as the absolute value of a local curvature decreases, the density of divergent light flux increases. Namely, by designing the aspherical lens AL such that the absolute value of a local curvature of the lens surface becomes a local minimum near the center of the lens, the density of divergent light flux increases and luminance improves.

In the aspherical lens AL1, a curve (a dashed line) indicating curvature distribution on the lens surface is a downward convex curve having a local minimum (see FIG. 11A). In the aspherical lens AL2, a curve (a dashed line) indicating curvature distribution on the lens surface is a curve having a local minimum and inflection points on both sides of the local minimum (see FIG. 11B). In the HUD apparatus 100, in order to improve luminance of an image displayed, it is important to improve luminance in the lens central region where pixel display light is approximately entirely incident on the lens surface. This exhibits an effect of improving luminance regardless of conditions of a lens peripheral region (a peripheral region of the lens central region within the effective diameter range) where almost no pixel display light is incident on the lens surface, as illustrated in FIG. 11A and FIG. 11B.

Such an effect can be obtained not only when absolute values of local curvatures of the lens surface become local minima in both the X-direction and the Y-direction, but also when an absolute value becomes a local minimum in one of the X-direction and the Y-direction and does not become a local minimum in the other direction (see dashed lines in FIGS. 12A through 12D).

When both the absolute values of the local curvatures CX and CY become the local minima, points at which the absolute values become the local minima coincide. Therefore, in terms of symmetry with respect to the X-axis and the Y-axis, it is preferable to have the local minima at the center of the lens. However, the absolute values of the curvatures CX and CY may take the local minima at a point shifted from the center of the lens in at least one of the X-direction and the Y-direction.

Further, in the aspherical lens AL, in any direction perpendicular to the Z-direction other than the X-direction and the Y-direction, an absolute value of a local curvature of the lens surface may become a local minimum or does not necessarily become a local minimum. However, when absolute values of local curvatures of the lens surface become local minima in both the X-direction and the Y-direction (when points at which the absolute values become the local minima coincide), it is assumed that the absolute values become local minima at the same point in all directions perpendicular to the Z-direction.

Figure 13:
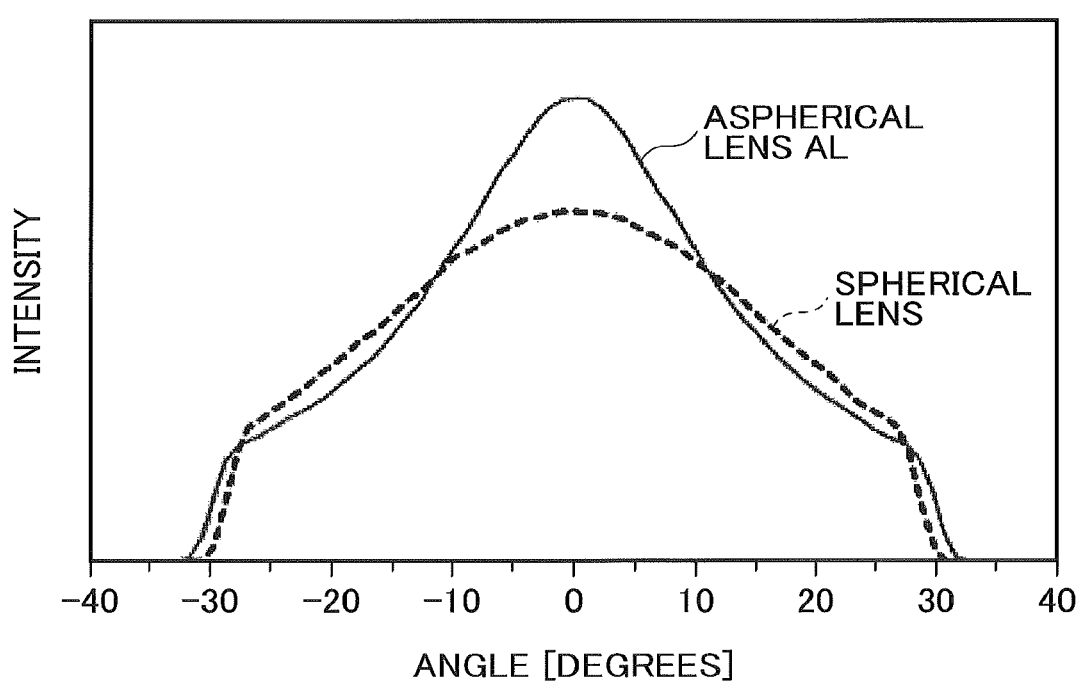
FIG. 13 is a graph illustrating divergence profiles of the aspherical lens AL and the spherical lens.

In FIG. 13, a dashed line schematically indicates a divergence profile of the spherical lens and a continuous line schematically indicates a divergence profile of the aspherical lens AL according to the present embodiment. Each of the lenses is designed to have a reference curvature such that light flux diverges within a region of approximately ±30 degrees. Further, the aspherical lens AL is designed such that an absolute value of a local curvature becomes a local minimum at the center of the lens. Accordingly, the density of divergence light flux becomes high, and luminance can be significantly improved.

In sum, the curvature distribution of the lens is set such that an absolute value of a local curvature becomes a local minimum in a specific region corresponding to a desired region within a viewing range. Accordingly, while light flux incident on the lens can reach the viewing range as in the conventional manner, a divergence angle of light flux incident on a region where the absolute values become the local minima becomes smaller than that of the peripheral region, and thus the light beam density increases.

The above-described effect of improving luminance can be exhibited when an absolute value of a local curvature of the lens surface becomes a local minimum in at least one of the X-direction and the Y-direction.

Figure 14A:
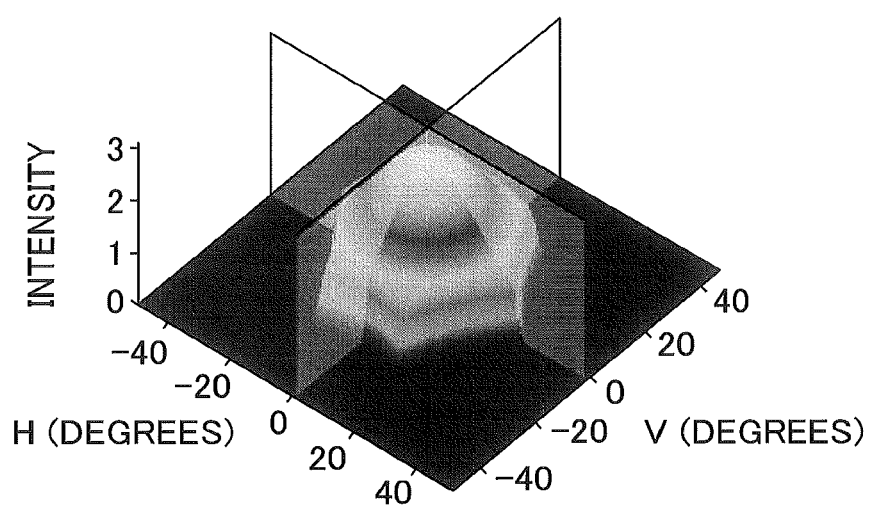
FIG. 14A is a drawing illustrating a divergence profile of the spherical lens.
Figure 14B:
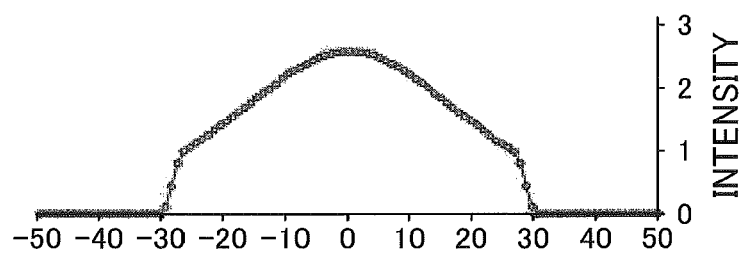
FIG. 14B is a drawing illustrating angular distribution of divergence intensities of the spherical lens in a horizontal direction.
Figure 14C:
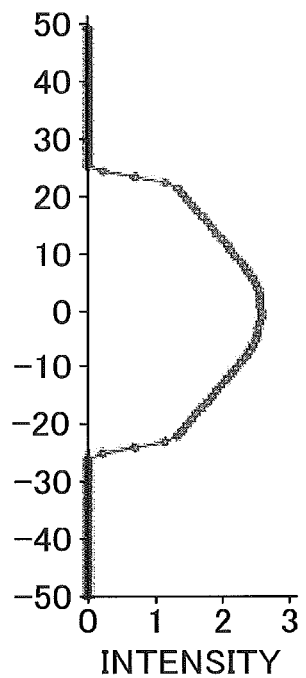
FIG. 14C is a drawing illustrating angular distribution of divergence intensities of the spherical lens in a vertical direction.
Figure 15A:
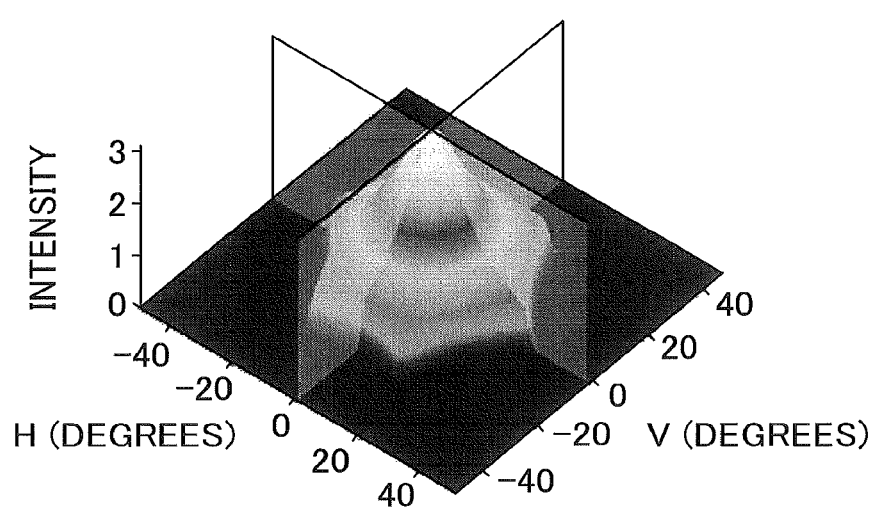
FIG. 15A is a divergence profile of the aspherical lens AL.
Figure 15B:
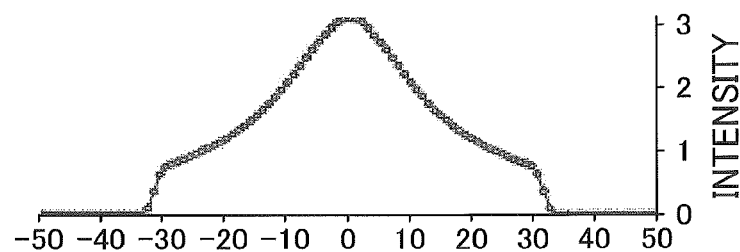
FIG. 15B is a drawing illustrating angular distribution of divergence intensities of the aspherical lens AL in a horizontal direction.
Figure 15C:
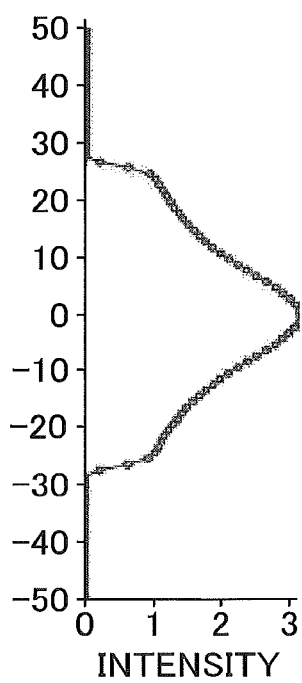
FIG. 15C is a drawing illustrating angular distribution of divergence intensities of the aspherical lens AL in a vertical direction.
Figure 16A:
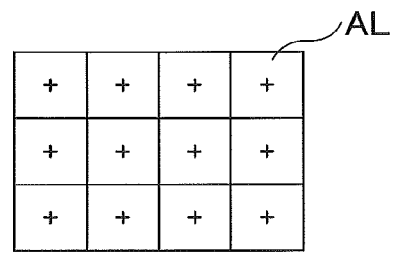
FIG. 16A is a plan view of a microlens array whose optical center coincides with a geometrical center in planar view.
Figure 16B:
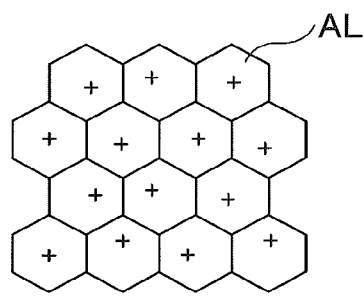
FIG. 16B is a plan view of a microlens array (part 1) whose optical center is randomly shifted from a geometrical center in planar view.
Figure 16C:
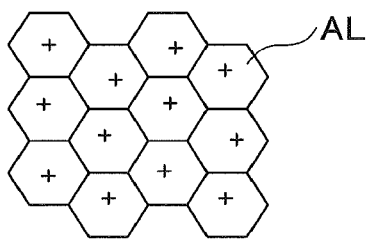
FIG. 16C is a plan view of a microlens array (part 2) whose optical center is randomly shifted from a geometrical center in planar view.
Figure 16D:
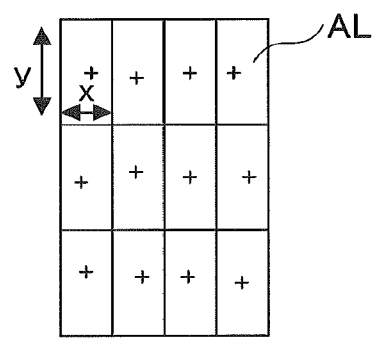
FIG. 16D is a plan view of a microlens array (part 3) whose optical center is randomly shifted from a geometrical center in planar view.
Figure 16E:
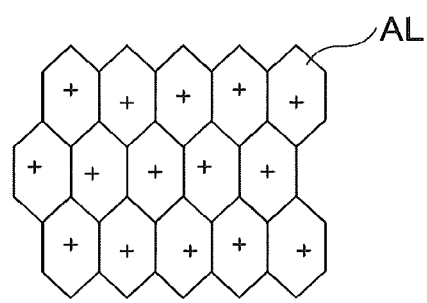
FIG. 16E is a plan view of a microlens array (part 4) whose optical center is randomly shifted from a geometrical center in planar view.
Figure 16F:
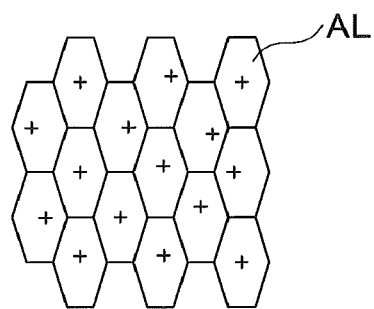
FIG. 16F is a plan view of a microlens array (part 5) whose optical center is randomly shifted from a geometrical center in planar view.
Figure 16G:
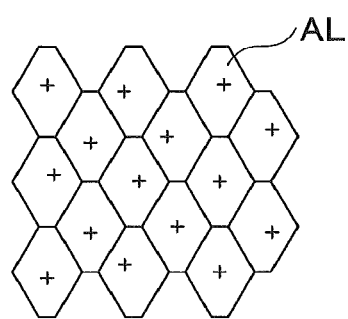
FIG. 16G is a plan view of a microlens array (part 6) whose optical center is randomly shifted from a geometrical center in planar view.
Figure 16H:
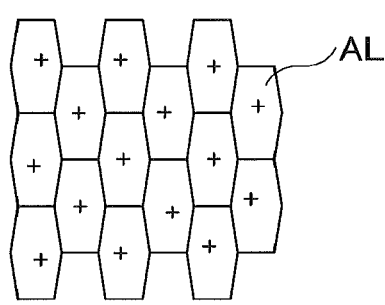
FIG. 16H is a plan view of a microlens array (part 7) whose optical center is randomly shifted from a geometrical center in planar view.

FIGS. 14A through 14C illustrate angular distribution of divergence intensities after light passes through a six-sided microlens (a spherical lens) in planar view according to a comparative example. FIGS. 15A through 15C illustrate angular distribution of divergence intensities after light passes through the six-sided microlens (the aspherical lens AL) in planar view according to the present embodiment. By comparing FIGS. 14A through 14C with FIGS. 15A through 15C, both lenses indicate that changes in divergence intensities are moderate. However, peaks of the intensities in FIGS. 15A through 15C are significantly higher than those in FIGS. 14A through 14C.

It is possible to significantly improve luminance when absolute values of local curvatures become local minima both in the X-direction and the Y-direction of the lens surface within the lens central region, namely within a region including the apex (the center) of the microlens.

The above-described discussion is achieved regardless of the microlens array. Namely, in various microlens arrays as illustrated in FIGS. 16A through 16F, an effect of improving luminance can be exhibited when an absolute value of a local curvature becomes a local minimum in a region that includes the apex (the center) of the microlens.

Further, as illustrated in FIG. 16D through 16H, even for differing aspherical lenses AL having different aspect ratios, an absolute value of a local curvature can be set to a local minimum in the desired region. Therefore, it is possible to exhibit the above-described effect by setting the absolute value of the local curvature to the local minimum. Further, an outer diameter of each of the lenses can be selected in such a manner that reduces interference by adjusting the aspect ratio of each of the lenses in accordance with the beam diameter or that controls vertical and horizontal divergence angles.

Further, in the aspherical lenses AL, even if the optical center of each of the aspherical lenses AL is randomly (irregularly) shifted from the geometrical center in planar view (i.e., even if a + symbol is shifted from the apex of each of the aspherical lenses AL as illustrated in FIGS. 16B through 16H), an absolute value of a local curvature can be set to a local minimum in the lens central region. In this case, in addition to the above-described effect of improving luminance, in-phase interference fringes or moire fringes are not likely to occur because the optical centers of the aspherical lens AL are non-periodically arranged.

Further, when a randomly eccentric arrangement is employed as illustrated in FIGS. 16B through 16H, the aspherical lenses AL may have shapes different from each other.

The microlens array (MLA) according to the present embodiment is technically achievable by using a known method. The microlens array (MLA) is made by injection molding using a mold. For example, the microlens array (MLA) can be made by using a cutting method that forms aspherical lens shapes on a mold, or can be made by controlling selectivity such as designing a mask and adjusting a gas flow rate ratio when creating a curved surface of a mold by photolithography or dry etching.

According to a first aspect, the screen 30 of the above-described embodiment is a screen member irradiated with image display light, and includes a plurality of microlenses 300 (optical elements) each having a lens surface (an optical surface that reflects light) on one side (an incident side). An absolute value of a local curvature of the lens surface changes in at least one of an X-direction and a Y-direction (two directions) in such a manner that becomes a local minimum at at least one position. The above two directions are perpendicular to each other on a plane (XY-plane) that is perpendicular to an optical axis of each of the microlenses 300.

Accordingly, it is possible to suppress divergence of light incident onto a predetermined region where the absolute value of the local curvature of the lens surface becomes the local minimum, and thus luminance of the light can improve. Further, in the predetermined region that has the local minimum, the absolute value of the local curvature gradually increases from a position at which the absolute value becomes the local minimum toward the outer edge of the lens surface. Accordingly, the degree of light divergence can be controlled, and also the visual field can be prevented from being narrowed.

As a result, it is possible to improve visibility while securing the visual field.

To be more specific, in the present embodiment, a divergence profile changes by forming distribution of local curvatures on the lens surface. In order to form the distribution, an absolute value of a local curvature is set smaller in a specific region of the lens surface corresponding to a desired region in a viewing range. Namely, the curvature distribution is set such that the absolute value becomes a local minimum in the specific region. Accordingly, light flux incident on each of the microlenses 300 can reach the viewing range as in the conventional manner. Also, a divergence angle of light flux incident on a region where an absolute value of a local curvature becomes a local minimum becomes smaller than that of the peripheral region, and thus the light beam density increases and luminance improves. As a result, visibility can be improved.

Namely, according to the present embodiment, while securing the entire viewing range, it is possible to improve visibility especially in the desired region.

Conversely, Patent Document 1 discloses a method for setting "a curvature corresponding to a main viewing region" to be smaller than "curvatures corresponding to sub viewing regions" such that sub-viewing ranges are provided while securing luminance of a main viewing range.

However, in Patent Document 1, because curvature distribution of a lens surface includes a central portion and peripheral portions, luminance abruptly changes at boundaries between the central portion and each of the peripheral portions (see FIG. in Patent Document 1). Alternatively, luminance abruptly changes at boundaries between linear change portions (which connect the central portion to each of the peripheral portions) and the central portion and also at boundaries between the linear change portions and the respective peripheral portions (see FIG. 10 in Patent Document 1). This causes discomfort with visibility. Further, as a difference in luminance between the central portion and the peripheral portions becomes larger in order to increase luminance of the central portion, abrupt changes in luminance at the boundaries between the linear change portions and the central portion and also at the boundaries between the linear change portions and the respective peripheral portions increase. This causes much more discomfort with visibility. Namely, in Patent Document 1, there is a need to improve visibility while securing a viewing range.

Further, for example, in a spherical lens, if the curvature of a lens central region is evenly set to be small in order to increase luminance of the lens central region as high as that of the microlenses 300, a required viewing angle (visual field) becomes unable to be obtained.

Further, the absolute value of the local curvature of the lens surface becomes the local minimum preferably in a region that includes a point of intersection of the lens surface and the optical axis of each of the microlenses 300.

In this case, luminance of pixel display light can significantly improve by illuminating the lens surface with the pixel display light such that the light is incident on the region that includes the above-described point of intersection.

Further, the absolute value of the local curvature of the lens surface preferably changes such that the absolute value becomes a local minimum in each of the X-direction and the Y-direction.

In this case, an effect of improving luminance can be exhibited approximately entirely on the lens surface.

Further, the absolute value of the local curvature of the lens surface preferably changes such that the absolute value becomes the local minimum in each of the X-direction and the Y-direction at the point of intersection described above.

In this case, luminance can be improved in the region that includes the above-described point of intersection.

Further, an average absolute value of local curvatures of the lens surface in the X-direction may be different from that in the Y-direction.

In this case, divergence angles in the X-direction and the Y-direction can be individually controlled. Thus, light utilization efficiency can be improved. For example, a divergence angle in the X-direction can be made larger in order to increase a viewing angle in the horizontal direction where a wide viewing angle is required. At the same time, a divergence angle in the Y-direction can be made smaller in order to decrease a viewing angle in the vertical direction where a wide viewing angle is not required. In this case, light utilization efficiency can be improved, compared to when divergence angles in the X-direction and the Y-direction are made larger or made smaller at the same rate.

Further, the absolute value of the local curvature of the lens surface preferably changes so as to be differentiable at a given position in at least one of the directions.

In this case, because the curvature does not abruptly change, discomfort with visibility can be suppressed.

The number of local minima for the absolute value of the local curvature of the lens surface in at least one of the directions (in which the absolute value becomes the local minimum) may be 1, and the differentiated value at a given position other than the position at which the absolute value becomes the local minimum may be a value other than 0.

In this case, the local minimum for the absolute value of the local curvature of the lens surface can monotonically decrease on one side and the local minimum can monotonically increase on the other side. Accordingly, a preferable divergence profile can be obtained (see FIG. 13).

Further, the absolute value of the local curvature of the lens surface preferably changes in a curved shape in at least one of the directions (in which the absolute value becomes the local minimum).

In this case, the absolute value of the local curvature of the lens surface can smoothly change in at least one of the directions. Thus, luminance can smoothly change in at least one of the directions. As a result, discomfort with visibility can be suppressed entirely on the lens surface in at least one of the directions.

Further, the absolute value of the local curvature preferably changes so as to be approximately line symmetrical about the optical axis of each of the microlenses 300 in at least one of the directions (in which the absolute value becomes the local minimum).

In this case, a divergence profile can be axially symmetrical about the optical axis of each of the microlenses 300 in at least one of the above-described directions. Thus, divergence characteristics and luminance characteristics on one side of the optical axis can become the same as those on the other side of the optical axis in at least one of the above-described directions.

Further, the absolute value of the local curvature does not necessarily change so as to be approximately line symmetrical about the optical axis of each of the microlenses 300 in at least one of the directions (in which the absolute value becomes the local minimum). Even in this case, the above-described effect can be provided by causing the absolute value of the local curvature to have a local minimum.

Further, the optical center of each of the microlenses 300 can be randomly (irregularly) shifted from the geometrical center in planar view.

In this case, occurrence of in-phase interference fringes or moire fringes can be suppressed and reduction in visibility can also be suppressed.

Further, the HUD apparatus 100 (an image display apparatus) according to the present embodiment includes the light source device 11 (a light source unit) configured to emit light (pixel display light) modulated in accordance with image data, the optical deflector 15 (an image display light generating element) configured to generate image display light based on the light (the pixel display light) emitted from the light source device 11, and the screen 30 irradiated with the image display light.

Accordingly, the HUD apparatus with improved visibility can be provided.

Further, pixel display light (light of image display light for each pixel) is preferably incident on a region that includes a point of intersection of the lens surface and the optical axis of each of the microlenses 300 on the screen 30.

Accordingly, the HUD apparatus with significantly improved visibility can be provided.

Further, the light source device 11 preferably includes a semiconductor laser.

Accordingly, it is possible to improve luminance by means of the high-power semiconductor while also suppressing speckles unique to a laser beam by means of a microlens array (MLA).

Further, the HUD apparatus 100 includes the concave mirror 40 (a light projecting unit) configured to project light (image display light), which has passed through the screen 30, onto the front windshield 50 (the transmissive reflection member). Thus, a predetermined region of the front windshield 50 can be irradiated with the light passing through the screen 30.

Further, according to a movable apparatus including the HUD apparatus 100 and a moving object in which the HUD apparatus 100 is installed, display images with high visibility can be provided to an occupant of the moving object.

According to a second aspect, the screen 30 of the present embodiment is a screen member irradiated with image display light and includes a plurality of microlenses 300 (optical elements) each having a lens surface (an optical surface that reflects light) on one side (an incident side). In a region that includes a point of intersection of the lens surface and the optical axis of each of the microlenses 300, the absolute value of the local curvature of the lens surface gradually increases from a predetermined position (such as a position at which an absolute value becomes a local minimum) within the region toward the outer edge of the lens surface in at least one of an X-direction and a Y-direction (two directions). The two directions are perpendicular to each other on a plane (XY-plane) that is perpendicular to an optical axis of each of the microlenses 300.

Accordingly, it is possible to suppress divergence of light incident onto a predetermined region where the absolute value of the local curvature of the lens surface becomes the local minimum, and also improve luminance of the light. Further, in the predetermined region that has the local minimum, the absolute value of the local curvature increases from the position at which the absolute value becomes the local minimum toward the outer edge of the lens surface. Accordingly, the degree of light divergence can be controlled. Also, the visual field can be prevented from being narrowed.

As a result, it is possible to improve visibility while securing the visual field.

Further, the curvature of the lens surface preferably changes in a curved shape in at least one of the directions.

In this case, the absolute value of the local curvature of the lens surface can smoothly change in at least one of the directions. Thus, luminance can also smoothly change. As a result, discomfort with visibility can be suppressed entirely in at least one of the directions of the lens surface.

Further, the curvature distribution on the lens surface of each of the microlenses 300 (the aspherical lens AL) in at least one of the X-direction and the Y-direction is not limited to the above-described embodiments and may be changed as necessary.

Figure 17:
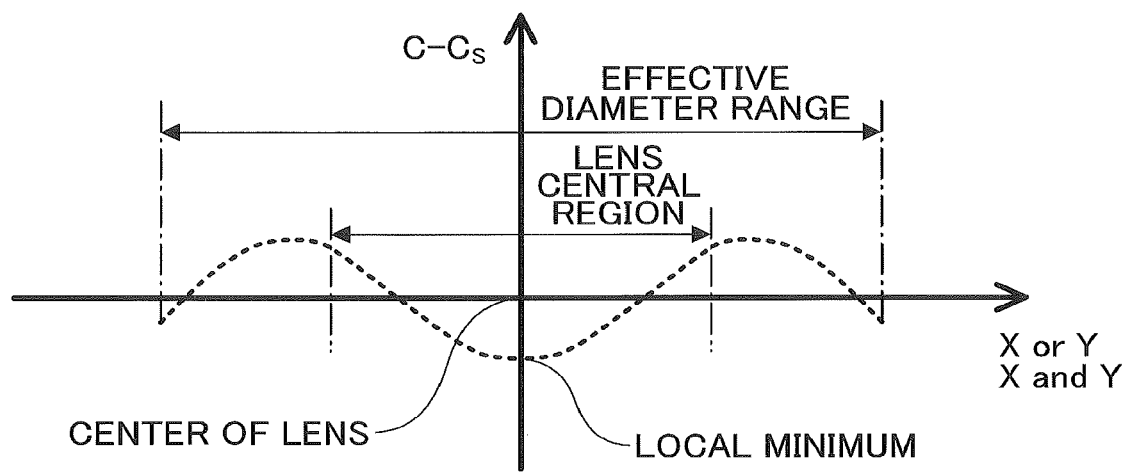
FIG. 17 is a drawing illustrating curvature distribution of an aspherical lens AL3 in at least one of an X-direction and a Y-direction with respect to a spherical lens.

For example, similarly to curvature distribution (a dashed line) of an aspherical lens AL3 illustrated in FIG. 17, a curve may have a local minimum and may have local maxima on both sides of the local minimum. In the curvature distribution of the aspherical lens AL3, the absolute value becomes the local minimum in a lens central region similarly to the above-described aspherical lenses AL1 and AL2. Thus, an effect can be exhibited regardless of conditions of a lens peripheral region where almost no pixel display light is incident. Further, at least one of curvature distribution of the aspherical lens AL in the X-direction and curvature distribution of the aspherical lens AL in the Y-direction may have a plurality of local minima.

Further, in the above-described embodiment, as the screen 30, a transmissive screen having a microlens array (MLA) has been described. However, in the case of a reflective screen, a similar effect can also be obtained by using the same principle. Further, such a reflective screen is implemented by forming a micro-mirror array in which a plurality of micro-mirrors (optical elements each having an optical surface that reflects light) such as micro-convex mirrors or micro-concave mirrors are arranged in an array on an incident side. The micro-mirror array can be manufactured by applying specular finishing to a plurality of convex portions or concave portions formed on a substrate (made of a resin or glass, for example) in an array, or can be manufactured by forming a reflective film by vacuum deposition or sputtering onto the convex portions or concave portions. Such convex portions or concave portions are formed by a method similar to the above-described production method of a microlens array (MLA). Further, an optical axis of each of the micro-mirrors refers to a straight line passing through an optical center and a focal point of each of the micro-mirrors.

Accordingly, as the screen member according to the embodiment of the present invention, either a transmissive screen or a reflective screen may be selected in accordance with the layout of the image display apparatus such as the HUD apparatus 100, for example.

Further, the transmissive screen according to the above-described embodiment has the micro-convex lenses as microlenses on the incident side. However, instead of the micro-convex lenses, the transmissive screen may have micro-concave lenses. The micro-concave lenses can be provided on the incident side of the screen by directly etching a glass plate, for example.

Further, in the above-described embodiment, the screen 30 has the microlens array on the incident side. However, the screen 30 may have the microlens array on an emission side instead of or in addition to the incident side. In this case, concave lenses or convex lenses may be used as microlenses arranged on the emission side. Also, in this case, an absolute value of a local curvature of the lens surface becomes a local minimum preferably in at least one of the X-direction and the Y-direction. In this case, an average absolute value of local curvatures of the lens surface in the X-direction may be different from that in the Y-direction.

Further, in the above-described embodiment, the optical deflector 15 (a two-axis MEMS scanner) is used as an image display light generating element. However, two MEMS scanners each including a micro-mirror and oscillating around one axis may be used in combination. Further, instead of the MEMS scanner(s), a single galvano scanner or two galvano scanners may be used, for example.

Further, in the above-described embodiment, the optical deflector is used as an image display light generating element. However, an imaging device such as a liquid crystal panel, a DMD panel, or a vacuum fluorescent display may be used instead.

Further, the image rendering region of screen 30 is not necessarily a flat surface and may be a curved surface. Namely, the microlens array or the micro-mirror array may have a curved shape as a whole.

Further, in the above-described embodiment, the optical axis of at least one of microlenses or micro-mirrors may be inclined with respect to an XY-plane (a plane where the microlenses or the micro-mirrors are arranged).

Further, in the above-described embodiment, the light projecting unit is configured by the concave mirror 40. However, the present invention is not limited thereto, and the light projecting unit may be configured by a convex mirror.

Further, in the above-described embodiment, although the scanning mirror 20 is included, the scanning mirror 20 is not required to be included. Namely, light deflected by the optical deflector 15 may be directly emitted onto the screen 30 or emitted via a convex lens without the optical path being turned back. Further, a plane mirror may be used as the scanning mirror 20.

Further, in the above-described embodiment, a laser diode (an edge-emitting laser) is used as a light source; however, a vertical-cavity surface-emitting laser (a surface-emitting laser) or other laser may be used.

Further, the transmissive reflection member is not limited to a front windshield of a moving object, and may be side glass or rear glass, for example. Namely, the transmissive reflection member is preferably a window member (a windshield, for example) that is attached to a moving object and allows an occupant to view the outside of the moving object.

Further, in the above-described embodiment, the image display apparatus (HUD apparatus) has been described as being installed in a moving object such as a vehicle, an aircraft, and a ship; however, the image display apparatus (HUD apparatus) may be installed in any object. The term "object" includes a permanently installed object and a transportable object.

Further, the image display apparatus according to the embodiment of the present invention is not limited to a HUD apparatus installed in a moving object, and may be used for electronic devices, such as a head-mounted display, a teleprompter, and a projector, designed for users to view images or virtual images.

For example, when the image display apparatus is used for a projector, the projector can be configured similarly to the HUD apparatus 100. Namely, image display light that has passed through the concave mirror 40 may be projected onto a projection screen or a wall. Further, the concave mirror 40 is not necessarily provided, and image display light that has passed through the screen 30 may be projected onto a projection screen or a wall without passing through the concave mirror 40. Further, instead of the concave mirror 40, a free-form curved mirror may be provided.

The specific numerical values and shapes indicated in the above-described embodiments are exemplary, and variations and modifications thereof may be suitably made without departing from the scope of the present invention.

In the following, the thinking process of the inventors to create the above-described embodiments will be described.

In a conventional head-up display, an image is formed by irradiating a microlens array having a plurality of microlenses with a laser beam modulated in accordance with image data, and a virtual image of the formed image is made visible on a transmissive reflection member. In such a conventional head-up display, it is known that a viewing range is adjusted by controlling curvatures of the microlenses so as to control divergence angles as desired.

However, because the conventional microlens array has a sphere shape or a simple spheroid, when a divergence angle is determined, a divergence profile is uniquely determined in accordance with the divergence angle. Further, as the divergence angle increases, luminance decreases. Therefore, when the divergence angle is set in such a manner that a required viewing range can be maintained, the luminance decreases at a viewpoint position in a standard driving posture of a driver. Accordingly, there is a problem in that an image becomes not visible even in a clear weather environment where high luminance is required.

In view of the above, the inventors have devised the above-described embodiments. Namely, local curvatures of each microlens are changed from spherical curvatures to aspherical curvatures so as to change distribution of a divergence profile. Thus, it becomes possible to improve luminance in a specific region while securing a certain viewing range.

According to at least one embodiment, it is possible to enhance visibility while securing a visual field.

Further, the present invention is not limited to these embodiments, but various variations and modifications may be made without departing from the scope of the present invention.

What is claimed is:

1. A screen member to be irradiated with image display light, the screen member comprising:
   an optical element having an optical surface configured to reflect or refract light,
   wherein an absolute value of a local curvature of the optical surface changes in one direction of a plane perpendicular to an optical axis of the optical element, and becomes a local minimum near a center of the optical element in the one direction, and
   wherein the optical surface is aspherical.

2. The screen member according to claim 1, wherein a plurality of optical elements each having the optical surface is provided on at least one side.

3. The screen member according to claim 2, wherein the absolute value of the local curvature becomes the local minimum in a predetermined region that includes a point of intersection of the optical surface and an optical axis of the optical element.

4. The screen member according to claim 2, wherein an optical center of the optical element is irregularly shifted from a geometrical center in planar view.

5. The screen member according to claim 2, wherein the optical element is a microlens or a micro-mirror.

6. The screen member according to claim 3, wherein the absolute value of the local curvature becomes the local minimum in each of two directions perpendicular to each other on a plane that is perpendicular to the optical axis of the optical element.

7. The screen member according to claim 6, wherein the absolute value of the local curvature becomes the local minimum at the point of intersection in each of the two directions.

8. The screen member according to claim 6, wherein average curvatures in the two directions are different from each other.

9. The screen member according to claim 1, wherein the curvature changes so as to be differentiable at a given position in the one direction.

10. The screen member according to claim 1, wherein a number of the local minima for the absolute value of the local curvature in the one direction is 1, and a differentiated value at a given position other than the position at which the absolute value becomes the local minimum is a value other than 0.

11. The screen member according to claim 1, wherein the local curvature changes in a curved shape in the one direction.

12. The screen member according to claim 1, wherein the local curvature changes with approximate line symmetry relative to the optical axis in the one direction.

13. An image display apparatus comprising:
    a light source unit configured to emit light modulated in accordance with image data;
    an image display light generating element configured to generate image display light based on the light emitted from the light source unit; and
    a screen member according to claim 1 irradiated with the generated image display light.

14. The image display apparatus according to claim 13, wherein light of the image display light for each pixel is incident on a predetermined region that includes a point of intersection of the optical surface and the optical axis of the optical element on the screen member.

15. The image display apparatus according to claim 13, wherein the image display light generating element includes an optical deflector configured to deflect light emitted from the light source unit.

16. The image display apparatus according to claim 13, wherein the light source unit includes a semiconductor laser.

17. The image display apparatus according to claim 13, further including a light projecting unit configured to project light that has passed through the screen member toward a transmissive reflection member.

18. An object apparatus comprising:
    the image display apparatus according to claim 13; and
    an object in which to install the image display apparatus.

19. A screen member irradiated with image display light, the screen member comprising:
    an optical element having an optical surface configured to reflect or refract light,
    wherein an absolute value of a local curvature of the optical surface changes in one direction of a plane perpendicular to an optical axis of the optical element, and also, in a region that includes a point of intersection of the optical surface and the optical axis, gradually increases from near a center of the region toward an outer edge of the optical surface, and
    wherein the optical surface is aspherical.

20. The screen member according to claim 19, wherein the local curvature changes in a curved shape in the one direction.

* * * * *